Patented June 7, 1932

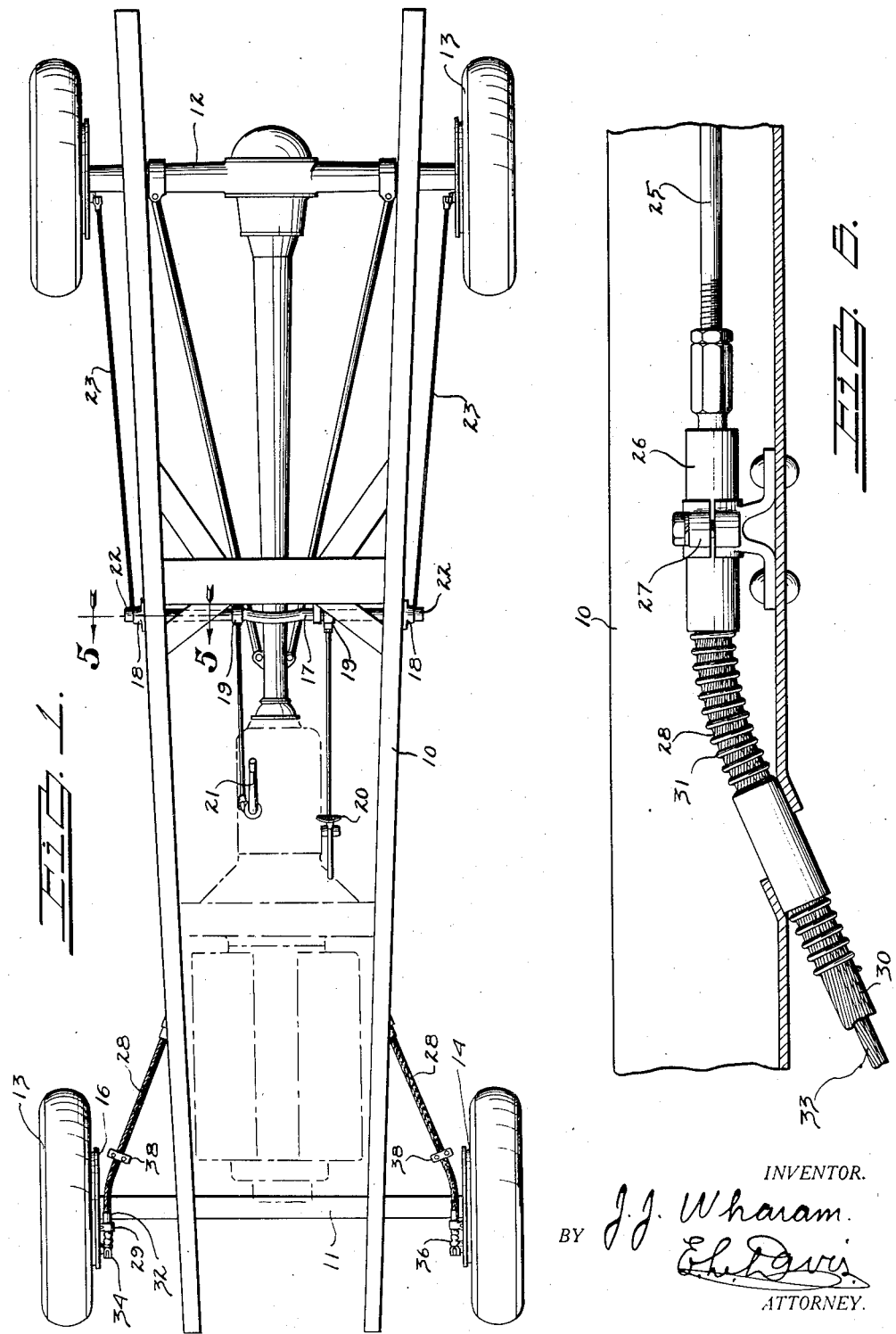

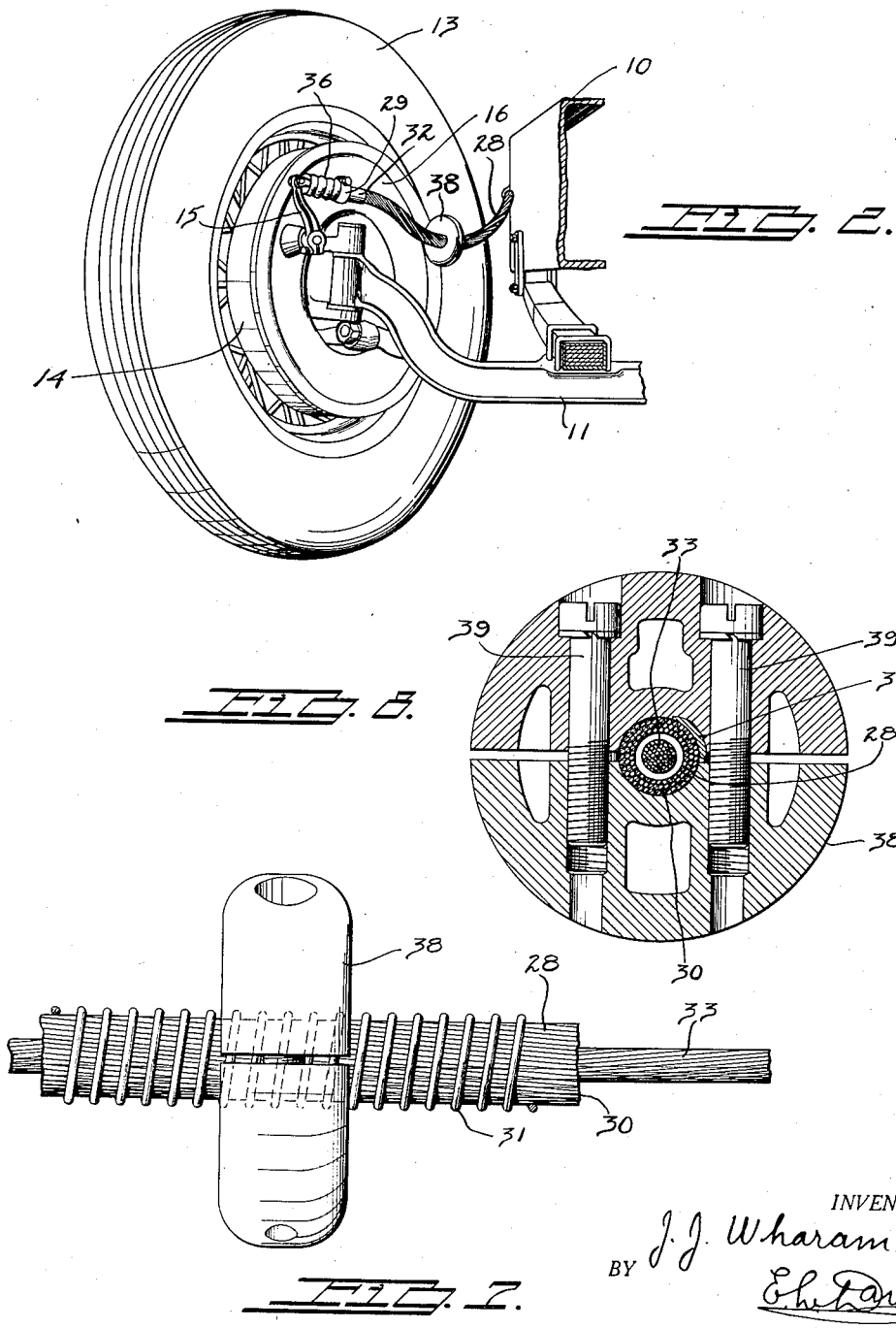

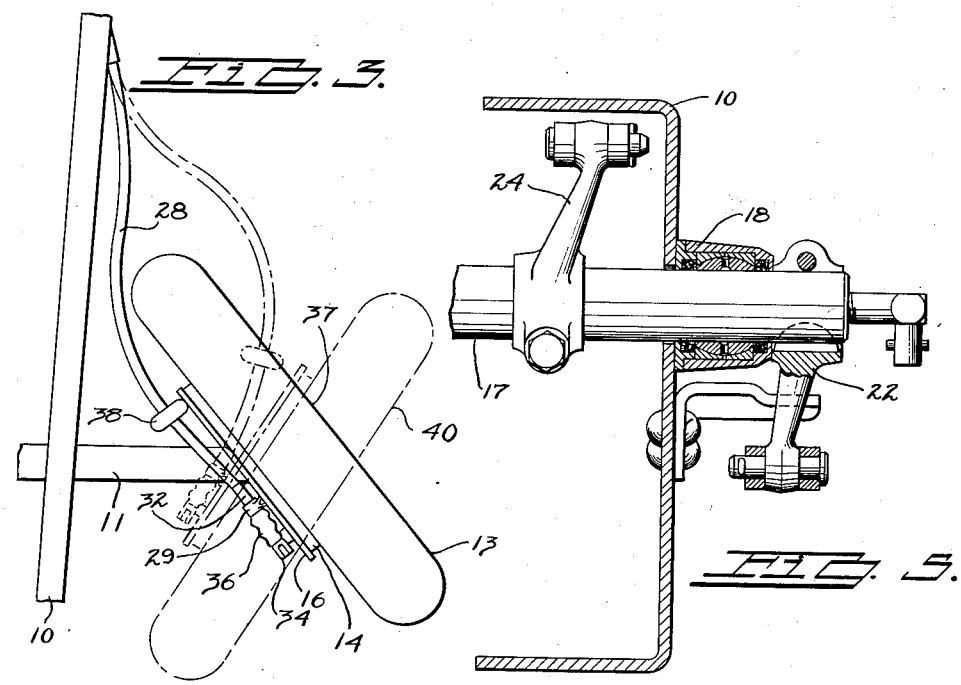
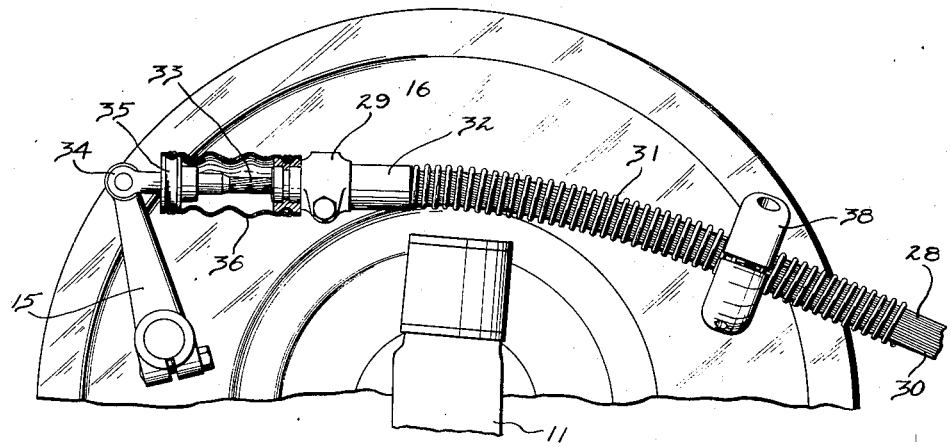

1,862,105

UNITED STATES PATENT OFFICE

JOHN J. WHARAM, OF DETROIT, MICHIGAN, ASSIGNOR TO FORD MOTOR COMPANY, OF DEARBORN, MICHIGAN, A CORPORATION OF DELAWARE

BRAKE OPERATING MECHANISM

Application filed May 28, 1931. Serial No. 540,679.

The object of my invention is to provide a brake operating mechanism especially suitable for use on automobiles. In this mechanism I have provided, to actuate the front wheel brakes, a flexible conduit having a brake operating cable reciprocally mounted therein, one end of which conduit is fastened to the frame of the car and the other end fastened to the brake anchor plate. When the front wheels are pivoted to steer the car, the flexible conduit simply bends thereby compensating for this turning movement. Heretofore, when such brake operating conduits have been used, trouble has frequently arisen for reason that when the wheels were turned the rear portion of the front inside tire often rubbed against the conduit thus causing great damage to the operating mechanism. A feature of particular importance in connection with this device is the means whereby the front wheel brake operating conduits are prevented from coming in contact with the front wheel tires when the wheels are turned to their extreme positions. My improved device although simply a metal protecting ring is clamped to the brake operating conduit in such position that when the wheels are turned this ring will bear against the brake anchor plate and deflect the conduit away from the tire so as to insure clearance under all conditions between the tire and the conduit.

Still a further object of my invention is to provide a novel protecting ring which will be inexpensive to manufacture, easy to install, and which will have means associated therewith whereby longitudinal shifting or sliding of the device on the conduit will be prevented.

With these and other objects in view, my invention consists in the arrangement, construction, and combination of the various parts of my improved device, as described in the specification, claimed in my claims, and illustrated in the accompanying drawings, in which:

Figure 1 shows the plan view of an automobile chassis having my improved brake actuating mechanism installed thereon.

Figure 2 is a perspective view of one of the vehicle's front wheels, illustrating the position of the applicant's conduit protecting ring.

Figure 3 shows a plan view of one of the front wheels, illustrating the function of the conduit protector, shown in Figure 2.

Figure 4 shows a view of the brake operating conduit and anchor plate, showing the flexible shield used herein to prevent foreign substances from entering the conduit.

Figure 5 shows a sectional view taken on the line 5—5 of Figure 1.

Figure 6 shows a sectional view through one of the frame side members, showing in particular the manner in which the conduit is projected through the frame side member.

Figure 7 shows a side elevation of one of my cable protecting rings; and

Figure 8 shows a central sectional view through the protecting ring, shown in Figure 7.

Referring to the accompanying drawings, I have used the reference numeral 10 to indicate generally a conventional chassis frame as usually provided with automobiles. The frame 10 is provided with front and rear axles 11 and 12, respectively, which are secured by suitable springs beneath the respective ends of the frame, and on the outer ends of which wheels 13 are rotatably mounted. The front pair of wheels 13 are pivotally mounted in the conventional manner on suitable king pins so that the car may be steered thereby.

Each of the wheels 13 is provided with a brake 14 in this case an internal expanding brake, each of which brakes is operated by the actuation of a lever 15 which is rotatably mounted on a brake anchor plate 16 associated with each brake 14. To actuate the four brakes simultaneously each of the levers 15 must be drawn toward the center of the car, and the means which I am about to describe functions so as to simultaneously actuate these levers.

I have provided a cross shaft 17 which extends across the frame 10 at about the center of the car, the ends of the cross shaft projecting through the frame side members in which they are rotatively mounted by means of a pair of suitable self-aligning bearings 18. The center portion of this cross shaft is provided with a pair of levers 19, extending downwardly therefrom, one of which levers is connected to a suitable foot pedal 20 and the other of which is connected to an emergency brake lever 21, so that when either the foot pedal or emergency brake lever is actuated the cross shaft is oscillated in the bearings 18.

The outer ends of the shaft 17 are each provided with an arm 22 secured thereto and which extends downwardly therefrom. The lower ends of each of these levers are connected to the rear wheel brake operating levers 15 by means of brake rods 23. In like manner, a second pair of arms 24 are secured to the shaft 17 just inside of each frame side member, which arms extend upwardly and are pivotally connected to a pair of rods 25 which extend forwardly along the inside of the frame to a position midway between the cross shaft and the front wheels. The forward end of each rod 25 is reciprocally mounted in a sleeve 26, this sleeve being secured to the frame 10 by means of a bracket 27. I have provided a flexible conduit 28 which is secured to and extends from the sleeve 26 out through the web of each frame side member to position adjacent to the front wheel brake anchor plate to which it is secured, the end thereof being fastened in a sleeve 32. A bracket 29, projecting from the inside face of the anchor plate securely fastens each sleeve 32 on the anchor plate to thereby hold the conduit in place.

Each of the conduits 28 consists of several spirally laid layers of spring wire 30, each succeeding layer having its spiral of the opposite hand from the layer beneath. It will be noted from Figure 7 that the spiral angle of these layers is exceedingly small, the total twist being only a little more than one complete turn for the full length of the conduit. Inasmuch as this conduit functions solely under compression, it is desirable to provide a minimum angle in winding the spiral. Of course the spiral is essential to thereby correctly equalize the discrepancy in length between the inside and outside portions of the conduit when it is bent through an arc, however, a spiral of one complete turn will perfectly equalize this discrepancy which is all that is required.

In order that the individual wires 30 of the conduit may not become dislodged, I have provided a coil of a spring wire 31 wrapped around the outside of the conduit which holds the layers of wire in place. The ends of all these wires are permanently fastened in the sleeve 26 and 32 so that the life of the conduit will be permanent if not subjected to abuse.

An operating cable 33 is reciprocally mounted in each conduit 28, each end of the cable projecting through the conduits. One end of each cable is secured to the arms 15 by means of suitable clevises 34, while the rear ends of the cables 33 are secured to the rods 25, whereby drawing the rods 25 rearwardly will pull the cables through the conduits and oscillate the levers 15 to apply the brake. The clevises 34 are each provided with an annular groove 35 therein to which a flexible fabric tube 36 is secured, these tubes extending from the clevises to the sleeves 32 so that operation of the brakes collapses the fabric tubes when the cables are pulled rearwardly through the conduits.

Referring to Figures 1, 2, and 3 it will be seen that the conduits 28 are subject to considerable bending from the maximum turning movement of the front wheels. A frequent cause of trouble in connection with such operating cables and conduits has been that when each front wheel is cramped to its extreme position, as shown in Figure 3, the conduit drops against the front wheel tire sometimes pulling the device loose from its fastenings or gradually wearing through the conduit. I have provided a novel protecting device whereby the contact of the cable with the tire is positively prevented. This protecting device is cheap to manufacture, easy to assemble, and having no movable parts makes it practically impossible to get out of order.

Referring to Figure 3, the two extreme turning positions of one front wheel is shown: the wheel when turned to form the inside of the curve being shown by solid lines 37, while the wheel when turned to form the outside of the curve being shown by dotted lines 40. From these two views, it will be noted that the conduit must be bent through a considerable curvature in order to compensate for the total turning movement of the wheel. If no supporting means were to be provided for the conduit between the brackets 26 and 29, then when wheel was turned to form the inside of the turning radius the tire would undoubtedly strike against the conduit. If the conduit were fastened permanently to the brake anchor plate in the position shown by lines 37 in Figure 3, then, when the wheel was turned to the position shown by the dotted lines 40, it could not pull away from the brake anchor plate and would either limit the turning radius of the wheels or would require a much longer conduit to be used. With my unique protecting device, I have arranged to keep the conduit in spaced relation from the anchor plate when the adjacent wheel is fully pivoted, while at the same time allowing the cable to pull loose from the plate when the wheel is turned oppositely to form the outside of the curve.

This protecting device consists of a pair of semi-circular castings 38 having an annular bore therethrough, and which are secured together by a pair of bolts 39 to form a disc-like ring around the conduit. This device which I have called a conduit protector is provided with a concentric bore therethrough in which a spiral groove corresponding to the spiral angle of the wire 31 is provided so that when the device is assembled on the conduit shifting of the device lengthwise will be prevented by this spiral groove.

It will be seen from Figure 3 that when the wheel is turned to the position to form the inside of the circle that the conduit is bent to a reverse curve, the brake anchor plate at this time bearing against the protector ring, and thereby deflecting the conduit away from the tire.

Among the many advantages arising from the use of my improved device, it may be well to mention that I am able to utilize a simple flexible conduit brake operating device between the front wheels and the car frame with the assurance that at no time will the device be liable to fail on account of contact with the front wheels of the car. Further, my protecting device is extremely simple to manufacture, install, and of very inexpensive construction so as to constitute only a negligible addition to the cost of the car.

Some changes may be made in the arrangement, construction, and combination of the various parts of my improved device without departing from the spirit of my invention and it is my intention to cover by my claims such changes as may reasonably be included within the scope thereof.

I claim as my invention:

1. In a vehicle brake operating mechanism, a steerable front wheel having a brake anchor plate associated therewith, a flexible conduit extending from the vehicle frame to said anchor plate having a brake actuating cable reciprocally mounted therein, and a protecting ring secured on the intermediate portion of said conduit in position to bear against the anchor plate and deflect the conduit clear of the rear portion of the front wheel when said portion is pivoted inwardly.

2. In a vehicle brake operating mechanism, a steerable front wheel having a brake anchor plate associated therewith, a flexible conduit extending from the vehicle frame to said anchor plate, the respective ends of the conduit being rigidly secured to the frame and plate whereby steering said front wheel flexes the conduit, a brake actuating cable reciprocally mounted in said conduit, and a protecting ring secured to the intermediate portion of said conduit in position to bear against the anchor plate and deflect the conduit clear of the rear portion of the front wheel when said portion is pivoted inwardly.

3. In a vehicle brake operating mechanism, a steerable front wheel having a brake anchor plate associated therewith, a flexible conduit extending from the vehicle frame to said anchor plate, a diametrically split protecting ring having means associated therewith whereby the ring is clamped over the intermediate portion of said conduit, and auxiliary retaining means whereby longitudinal movement of the ring on the conduit is prevented, said ring being secured in position to bear against the anchor plate and deflect the conduit clear of the rear portion of the front wheel when said portion is pivoted inwardly.

4. In a vehicle brake operating mechanism, a steerable front wheel having a brake anchor plate associated therewith, a flexible conduit extending from the vehicle frame to said anchor plate, the respective ends of the conduit being rigidly secured to said frame and plate whereby steering said front wheel flexes the conduit, a brake actuating cable reciprocally mounted in said conduit, and a diametrically split protecting ring having a pair of bolts extending therethrough whereby the ring is clamped over the intermediate portion of said conduit, said ring having auxiliary retaining means associated therewith whereby longitudinal movement of the ring on the conduit is prevented, said ring being secured in position to bear against the anchor plate and deflect the conduit clear of the rear portion of the front wheel when said portion is pivoted inwardly.

5. In a vehicle brake operating mechanism, a steerable front wheel having a brake anchor plate associated therewith, a flexible conduit extending from the vehicle frame to said anchor plate having a spirally wound retaining wire therearound extending from end to end, a brake actuating cable reciprocally mounted in said conduit, and a protecting ring secured over the intermediate portion of said cable, said ring having a spiral groove formed therein complimentary to the spirally wound retaining wire, whereby longitudinal movement of the ring on the conduit is prevented to thereby retain the ring in position to bear against the anchor plate and deflect the conduit clear of the rear portion of the front wheel when said portion is pivoted inwardly.

6. In a vehicle brake operating mechanism, a steerable front wheel having a brake anchor plate associated therewith, a flexible conduit extending from the vehicle frame to said anchor plate, the respective ends of said conduit being rigidly secured to the frame and plate whereby steering of said front wheel flexes said conduit, said conduit having a spirally wound retaining wire therearound extending from end to end, a brake actuating cable reciprocally mounted in said conduit, and a diametrically split protecting ring having means associated therewith to clamp the ring over the intermediate portion of said conduit, said ring having a spiral groove machined therein complementary to said spirally wound retaining wire whereby longitudinal movement of the ring on the conduit is prevented to thereby secure the ring in position to bear against the anchor plate and deflect the conduit clear of the rear portion of the front wheel when said portion is pivoted inwardly.

JOHN J. WHARAM.